(12) United States Patent
Kyrtsos et al.

(10) Patent No.: US 8,577,514 B2
(45) Date of Patent: Nov. 5, 2013

(54) AMBIENT TEMPERATURE ESTIMATION

(75) Inventors: Christos Kyrtsos, Beverly Hills, MI (US); Michael Buckenmeyer, Columbus, IN (US); Kenneth Gerard Brown, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 13/346,019

(22) Filed: Jan. 9, 2012

(65) Prior Publication Data

US 2013/0179032 A1 Jul. 11, 2013

(51) Int. Cl.
*G06G 7/56* (2006.01)
*G01K 13/00* (2006.01)
*G06F 17/10* (2006.01)

(52) U.S. Cl.
USPC .................................. 701/1; 701/36; 374/144

(58) Field of Classification Search
USPC ........... 701/36, 1; 374/109, 144; 702/130, 99; 703/2, 6
See application file for complete search history.

(56) References Cited

U.S. PATENT DOCUMENTS

| | | | |
|---|---|---|---|
| 4,567,459 A | 1/1986 | Folger et al. | |
| 4,682,536 A | 7/1987 | Nolting | |
| 5,322,360 A | 6/1994 | Willis et al. | |
| 5,416,728 A * | 5/1995 | Rudzewicz et al. | 702/130 |
| 5,895,117 A | 4/1999 | Wuertenberger | |
| 6,088,661 A | 7/2000 | Poublon | |
| 6,650,237 B2 | 11/2003 | Yamada et al. | |
| 6,665,629 B2 | 12/2003 | Mannakal et al. | |
| 6,974,251 B2 | 12/2005 | DeRonne et al. | |
| 7,274,867 B2 | 9/2007 | Peukert | |
| 7,387,437 B2 | 6/2008 | Brown et al. | |
| 7,392,662 B2 | 7/2008 | Gao | |
| 7,572,055 B2 * | 8/2009 | Kubota et al. | 374/142 |
| 7,599,812 B2 | 10/2009 | Kyrtsos et al. | |
| 7,668,686 B2 | 2/2010 | Conte et al. | |
| 2004/0184509 A1 | 9/2004 | DeRonne et al. | |
| 2006/0209921 A1 | 9/2006 | Brown et al. | |
| 2009/0099804 A1 | 4/2009 | Kyrtsos et al. | |
| 2010/0205938 A1 | 8/2010 | Ding | |
| 2010/0222987 A1 * | 9/2010 | Recouvreur et al. | 701/103 |
| 2011/0106505 A1 | 5/2011 | Hawkins et al. | |

* cited by examiner

*Primary Examiner* — Tan Q Nguyen
(74) *Attorney, Agent, or Firm* — Frank A. MacKenzie; Price Heneveld LLP

(57) ABSTRACT

A method for predicting an ambient temperature around a moving motor vehicle includes utilizing measured ambient temperatures and Newton's Cooling Law. A linear best fit line describing the time constant as a function of vehicle speed can be generated utilizing measured data. In use, the b values can be determined from the best fit line, and the b values can be utilized to provide a predicted or estimated ambient temperature before the measured temperatures drop to the ambient temperature.

20 Claims, 6 Drawing Sheets

AMBIENT TEMPERATURE ESTIMATION

FIELD OF THE INVENTION

The present invention generally relates to sensing ambient temperature utilizing a sensor.

BACKGROUND OF THE INVENTION

Various systems for motor vehicles have been developed for estimating the outside ambient temperature. Present systems may utilize an algorithm that waits for either cool engine coolant temperatures, or for the motor vehicle to be above a certain speed for a set amount of time. Once either of these are accomplished, readings from the outside ambient temperature sensor are read and used. However, determining the outside ambient temperature utilizing this type of system may require a substantial length of time before accurate ambient temperature measurements can be determined, or the temperature estimates may be inaccurate. These systems can be especially problematic if a vehicle is driving in a city environment, and it is not maintaining speed for long amounts of time. In this case, the ambient temperature might never update, even if it is actually changing, leading to decreased performance in climate controls as well as an inaccurate value being displayed to the vehicle occupants.

SUMMARY OF THE INVENTION

One aspect of the present invention is a temperature sensing system for motor vehicles and the like. The temperature sensing system includes a temperature sensor mounted to a vehicle to measure temperature of the air outside of the vehicle, wherein the air outside of the vehicle defines an ambient temperature. The temperature sensing system further includes a controller operably connected to the temperature sensor. The controller obtains a plurality of temperature readings from the temperature sensor at distinctly different times. The different times may be measured relative to a start time at which vehicle motion first occurs according to predefined criteria. The start time may also be defined by other criteria that do not involve vehicle motion or the start of vehicle motion. The rate of change of the temperature of the readings from the temperature sensor when the temperature sensor is exposed to air at an ambient temperature occurs according to Newton's Cooling Law. As the sensor begins to cool down, it will follow the form $(a-c)*e^{(-b*t)}+c$, where "a" is the initial value (at t=0), "b" is the time constant that best fits the data, and "c" is the value the temperature will converge to as time goes to infinity. Thus, "c" is the actual ambient temperature in the present case. As discussed in more detail below, the time constant "b" may actually vary depending on vehicle speed, such that it is not actually a constant. Thus, the term "time factor" has been utilized herein where appropriate instead of the term "time constant" in portions of the present application.

A typical temperature versus time graph for a vehicle in stop and go traffic is shown in FIG. 2. In FIG. 2, the dashed line designated "A1" is the ambient raw temperature (i.e. the temperature as measured by a temperature sensor on the vehicle), the line "A2" is the actual outside ambient temperature, and the line A3 is a manual extrapolation of the line A1. In general, the ambient raw temperature A1 increases when a vehicle stops, and goes down when the vehicle starts moving. The lowermost points "B1," "B2," "B3," etc. of the ambient raw temperature tend to converge over time to the actual outside ambient temperature A2.

One aspect of the present invention is a controller that is configured to utilize a time factor multiplied by a difference between temperature readings of the temperature sensor at a plurality of selected times, and an ambient temperature at the selected times such that a difference between the temperature readings and an ambient temperature is reduced over time until the temperature readings are about equal to the ambient temperature. The controller may be configured to utilize predefined data concerning the time factor to estimate the ambient temperature utilizing a plurality of temperature readings taken at selected times. In general, this is done when there is a significant difference between at least some of the temperature readings. The controller may also utilize at least two different values of the time factor for measured vehicle speeds to estimate the ambient temperature. The system may be able to estimate the ambient temperature within about 1 degree Celsius of the actual ambient temperature in about 20 seconds or less.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
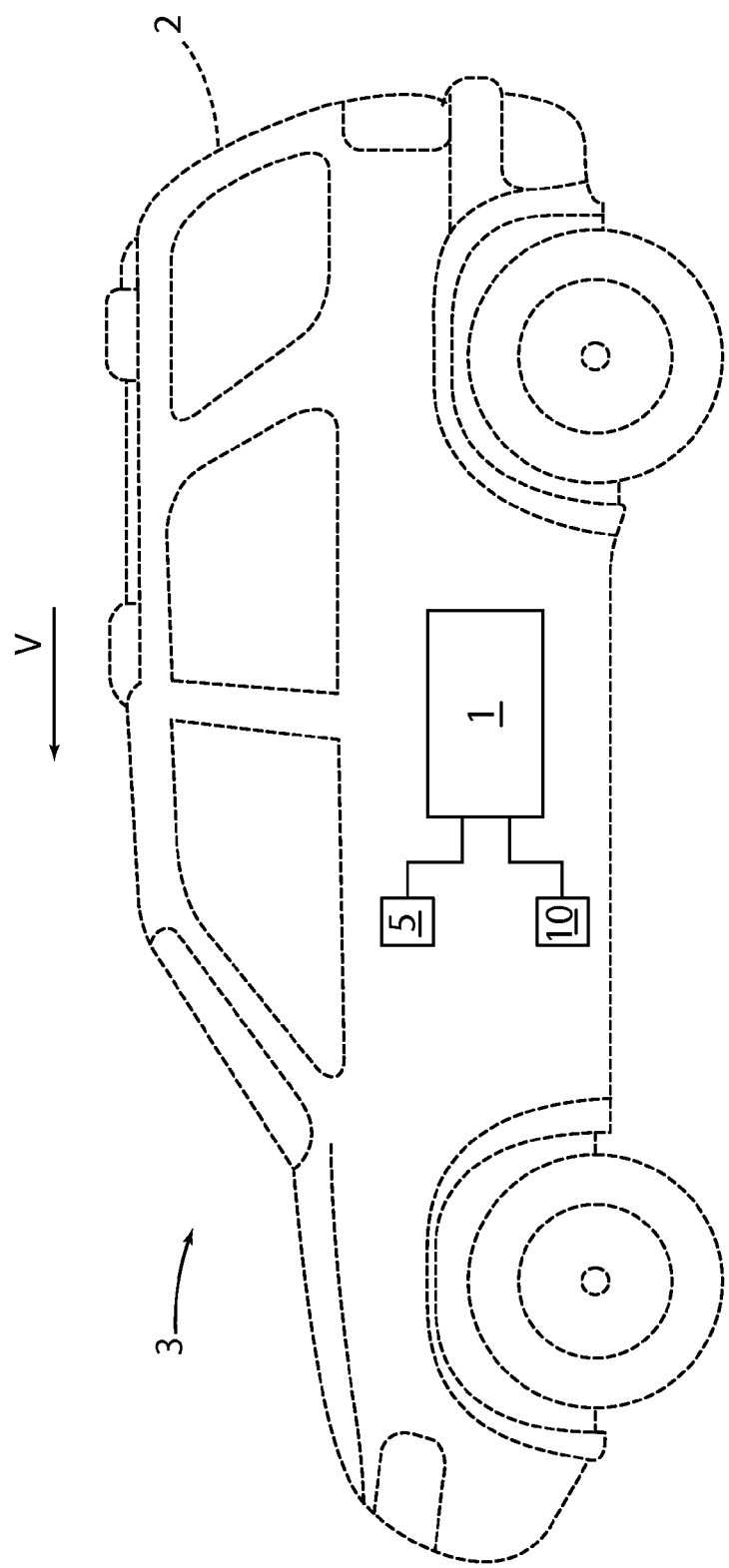
FIG. 1 is a schematic view of a vehicle including a temperature sensing system according to one aspect of the present invention.
Figure 2:
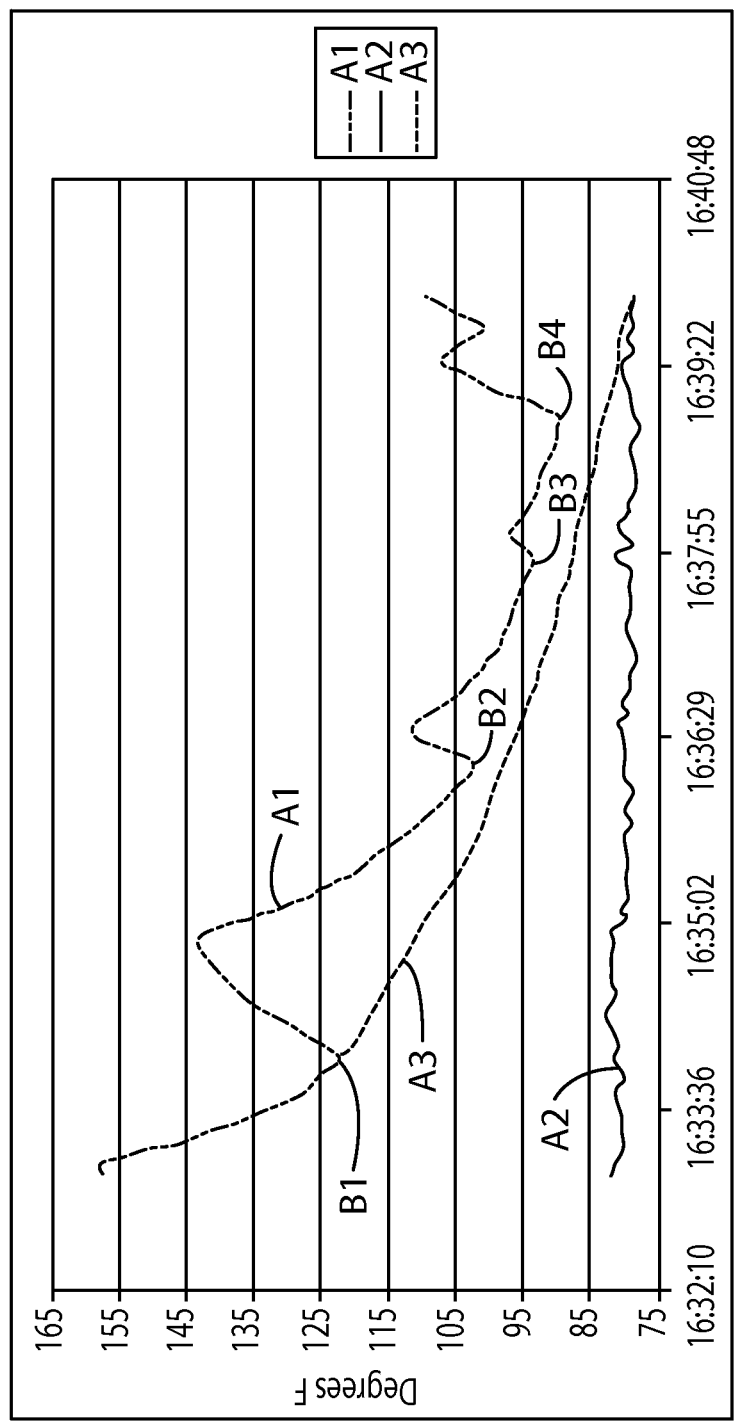
FIG. 2 is a graph showing a typical temperature versus time relationship for a vehicle in stop and go traffic.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specifications are simply exemplary embodiments of the inventive concepts defined in the appended claims. Hence, specific dimensions and other physical characteristics relating to the embodiments disclosed herein are not to be considered as limiting, unless the claims expressly state otherwise With reference to FIG. 1, a motor vehicle 3 includes an outer surface 2, a controller 1, a temperature sensor 5, and a velocity sensor 10. The temperature sensor 5 may be mounted at the vehicle surface 2 or other location where the temperature sensor 5 is exposed to ambient air flowing around the vehicle surface 2. It will be understood that the temperature sensor 5 may be mounted inside of the outer surface 2 at a location behind the vehicle grill or the like wherein ambient air flows around temperature sensor 5. Sensor 5 may be mounted directly adjacent a cooling fan (not shown) at a vehicle's radiator to ensure that air flows over the temperature sensor 5 even if a vehicle is parked. The motor vehicle 3 also includes a speed sensor 10 that is operably connected to the controller 1. The controller 1, temperature sensor 5, and vehicle speed sensor 10 may comprise existing components of a motor vehicle 3. However, according to the present invention, the controller 1 may be programmed or otherwise configured to utilize data from the temperature sensor 5 and, optionally speed sensor 10, to estimate or predict an actual outside temperature. This is in contrast to systems that utilize a temperature as measured by sensor 5 as if it were an actual ambient temperature.

One aspect of the present invention is a method that includes determining an equation for the actual ambient temperature "C" as a function of the time constant ("b") and time ("t"). The derivation is as follows:

$$f(t) = a*e^{(-b*t)} + c$$

$$f(t_1) = a*e^{(-b*t1)} + c$$

$$f(t_2) = a*e^{(-b*t2)} + c$$

$$f(t_1) - f(t_2) = a*e^{(-b*t1)} - a*e^{(-b*t2)}$$

$$a = (f(t_1) - f(t_2)) / E e^{(-b*t1)} - e^{(-b*t2)})$$

thus:

$$a = (f(t_2) - f(t_3)) / (e^{(-b*t2)} - e^{(-b*t3)})$$

and:

$$(f(t_1) - f(t_2))*(e^{(-b*t2)} - e^{(-b*t3)}) = (f(t_2) - f(t_3))*(e^{(-b*t1)} - e^{(-b*t2)})$$

Substituting $e^{((-b*t1)*(t3/t1))}$ for $e^{(-b*t3)}$ and $e^{((-*t1)*(t2/t1))}$ for $e^{(-b*t2)}$ and then $X = e^{(-b*t1)}$ as well as choosing $t_3$ and $t_2$ such that $(t_3/t_1) = 3$ and $(t_2/t_1) = 2$:

$$(f(t_1) - f(t_2))*(X^2 - X^3) = (f(t_2) - f(t_3))*(X - X^2)$$

It is then possible to solve for X:

$$X = (f(t_2) - f(t_3)) / (f(t_1) - f(t_2)) \text{ and since } X = e^{(-b*t1)}, \text{ it is possible to solve for } b:$$

$$b = -(1/t_1)*\ln((f(t_2) - f(t_3))/(f(t_1) - f(t_2))).$$

c is then found by:

$$a = ((f(t_1) - f(t2))/(e^{(-b*t1)} - e^{(-b*t2)}))$$

$$c = f(t_1) - a*e^{(-b*t1)} = f(t_2) - a*e^{(-b*t2)}$$

In general, this method is accurate if the input data is noise free/accurate (i.e. the equation for the actual ambient temperature "c" provides a mathematically precise way to calculate the actual ambient temperature). However, this method may not provide an accurate prediction if noise or other error is added to the measured values for measured temperature "a", time "t" and/or the time constant "b". For example, if a 1% zero mean Gaussian random error is added to the data, the predicted temperature may not converge toward the actual ambient temperature. Thus, although this method provides a very accurate solution if highly accurate data can be obtained, this method may not provide acceptable results if more typical data including random errors or other variations is utilized. Typical temperature sensors 5 (FIG. 1) in "real world" situations provide data having significant errors or other variations that may cause this method to fail.

Figure 3:
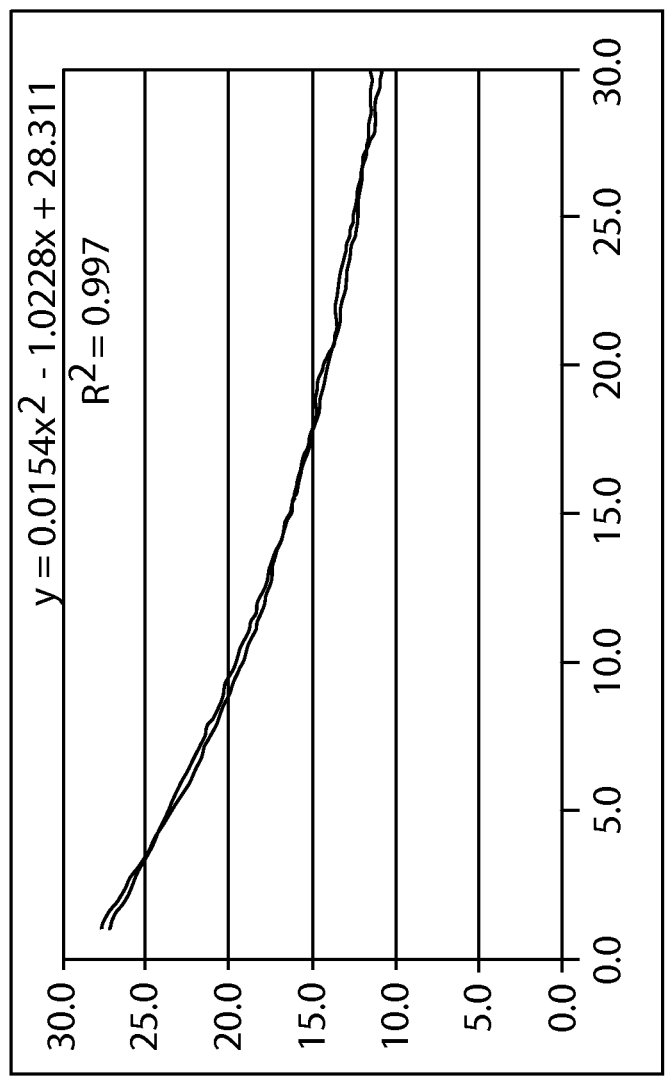
FIG. 3 is a graph of a second order polynomial curve fit showing measured temperature versus time.

A second method for estimating the ambient temperature according to another aspect of the present invention includes generating data points of measured temperature at specific times, and utilizing a second order polynomial to fit the data points. The data points may comprise measured temperatures taken at one second intervals, with the first measurement being taken immediately after the vehicle begins to move. This curve (FIG. 3) can then be utilized to estimate the actual ambient temperature utilizing measured temperatures at specific times. The fit can be expressed as follows:

$$\delta f/\delta a = \Sigma(f(t_i) - a*e^{(-b*ti)} - c) = 0 \quad \quad 1.$$

$$\delta f/\delta b = \Sigma t_i*e^{(-b*ti)}*(f(t_i) - a*e^{(-b*ti)} - c) = 0 \quad \quad 2.$$

$$\delta f/\delta c = \Sigma e^{(-b*ti)}*(f(t_i) - a*e^{(-b*ti)} - c) = 0 \quad \quad 3$$

Through substitution and rearranging, c can be found by:

$$c = \Sigma e^{(-b*ti)}*(t_i*f(t_i) + f'(t_i))/(\Sigma t_i*e^{(-b*ti)})$$

$f'(t_i)$ can be found by:

$$\delta f/\delta b = (t_i/b)*\delta f/\delta t$$

And $\delta f/\delta \cdot t$ is simply $\Delta f/\Delta t$.

Utilizing this fit, the estimated or predicted ambient temperature can be found to within about two degrees Celsius of the actual ambient temperature. The following data shows the raw (measured) temperature obtained during testing, the actual ambient temperature as measured during testing, and the predicted temperature determined using the second method.

| Actual Ambient Temperature | Time | Raw (Measured) Temperature | Predicted/Estimated Temperature |
|---|---|---|---|
| 6.16 | 0.0 | 28.0 | |
| 6.17 | 1.0 | 27.8 | |
| 6.18 | 2.0 | 26.8 | 8 |
| 6.19 | 3.0 | 25.5 | 9 |
| 6.23 | 4.0 | 24.5 | 10 |
| 6.25 | 5.0 | 23.5 | 10 |
| 6.27 | 6.0 | 22.5 | 9 |
| 6.26 | 7.0 | 21.8 | 9 |
| 6.24 | 8.0 | 20.8 | 9 |
| 6.22 | 9.0 | 20.0 | 9 |
| 6.21 | 10.0 | 19.3 | 9 |
| 6.19 | 11.0 | 18.5 | 9 |
| 6.17 | 12.0 | 18.0 | 8 |
| 6.15 | 13.0 | 17.5 | 8 |
| 6.12 | 14.0 | 17.0 | 8 |
| 6.1 | 15.0 | 16.5 | 8 |
| 6.09 | 16.0 | 16.0 | 8 |
| 6.09 | 17.0 | 15.5 | 8 |
| 6.08 | 18.0 | 15.0 | 8 |
| 6.06 | 19.0 | 14.8 | 8 |
| 6.05 | 20.0 | 14.3 | 8 |
| 6.04 | 21.0 | 13.8 | 8 |
| 6.03 | 22.0 | 13.5 | 8 |
| 6.01 | 23.0 | 13.3 | 8 |
| 6 | 24.0 | 13.0 | 8 |
| 5.99 | 25.0 | 12.5 | 8 |
| 5.96 | 26.0 | 12.3 | 8 |
| 5.95 | 27.0 | 12.0 | 8 |
| 5.93 | 28.0 | 11.5 | 8 |
| 5.92 | 29.0 | 11.3 | 8 |
| 5.9 | 30.0 | 11.0 | 9 |

The predicted temperatures above were obtained utilizing the equation for temperature (y in FIG. 3) of the form:

$$y = 0.0154x^2 - 1.0228x + 28.311$$

wherein:

$R^2=0.997$

It will be understood that the constants utilized in this equation will normally be at least somewhat different for different vehicles. Test results on a test vehicle of a particular make and model may be utilized to determine the values of these constants. As shown above, in 20 seconds the predicted temperature is within about 2 degrees Celsius of the actual ambient temperature, and the predicted temperature stabilizes at a value that is within about 3 degrees Celsius of the actual ambient temperature. The numerical value of one or more of the constants utilized in the equation for the predicted or estimated temperature may be adjusted based on further testing if it is determined that such adjustment provides for a more accurate predicted or estimated temperature. For example, in the example given above the constant 28.311 could be changed to 26.311, such that each of the predicted temperatures in the example are 2 degrees lower than the predicted temperatures given above.

Yet another method of determining a predicted or estimated ambient temperature according to the present invention includes determining a relationship between vehicle speed and the time factor ("time constant") designated "b" in the following equations. According to this method or aspect of the invention, data is collected from a test vehicle. Then, b is found by using the actual ambient temperature for "c", solving for "a" by subtracting "c" from the raw (measured) temperature, then rearranging the equation $f(t_i)=a*e^{(-b*t)}+c$ to:

$$b=-\ln((f(t_i)-c)/a)/t_i$$

Each b value is then correlated with the vehicle speed at that particular instant. These values may be calculated for specific time intervals (e.g. 30 seconds), and then plotted on a scatter plot, with a linear best fit line. The linear best fit line is then used as the correlation between the vehicle speed and the time factor "b" or "Beta" in FIG. 4. Once b is found, it is relatively simple to solve for c:

$$c=f(t_i)-(f(0)-f(t_1))*e^{(-b*t1)}/(1-e^{(-b*t1)}))=(f(t_i)-f(0)*e^{(-b*t1)})/(1-e^{(-b*t1)})$$

Thus, once the calibration or correlation between b and speed is found, a value for c can be calculated utilized only two data points. Although only two data points are required to calculate c, more data points may be utilized if desired for a particular application. Also, although c can be readily calculated, the value for c calculated using this method is typically not accurate until about 15 to 20 seconds after the measured temperature begins falling (i.e. the vehicle begins moving). Within 15 to 20 seconds, a value of c within about 1 degree celsius of the actual ambient temperature can typically be achieved.

Figure 4:
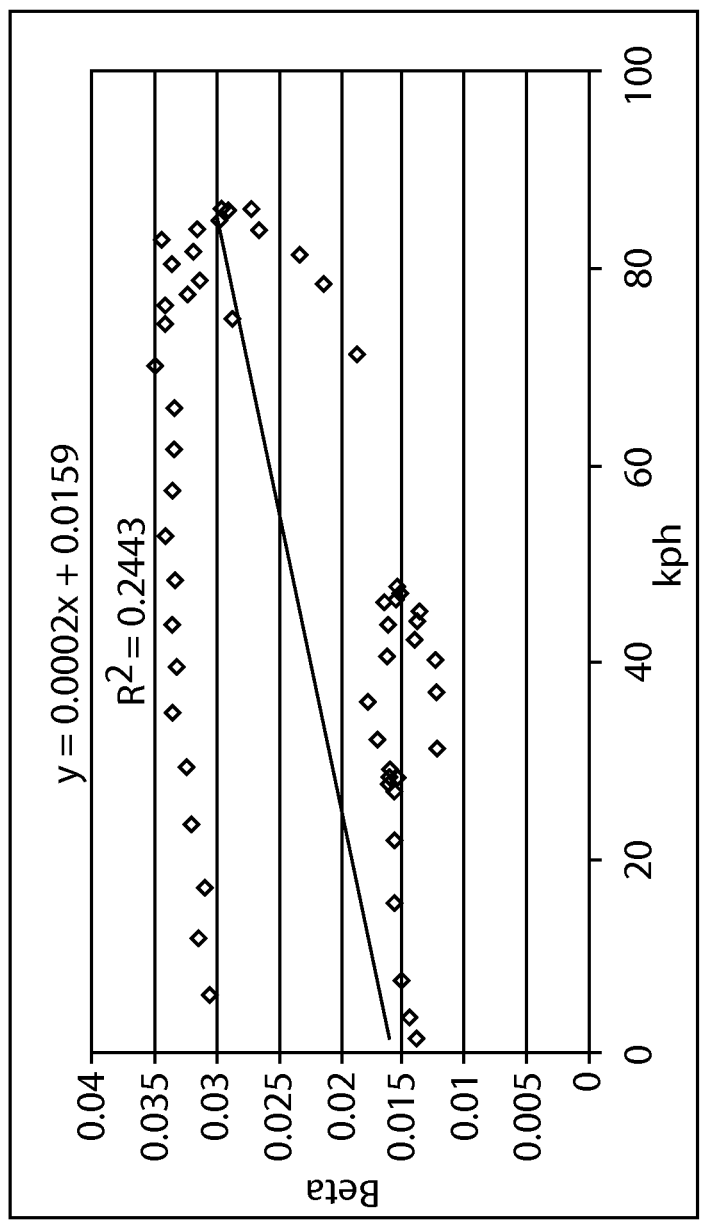
FIG. 4 is a graph showing a linear best fit line for the time factor as a function of vehicle speed.
Figure 5:
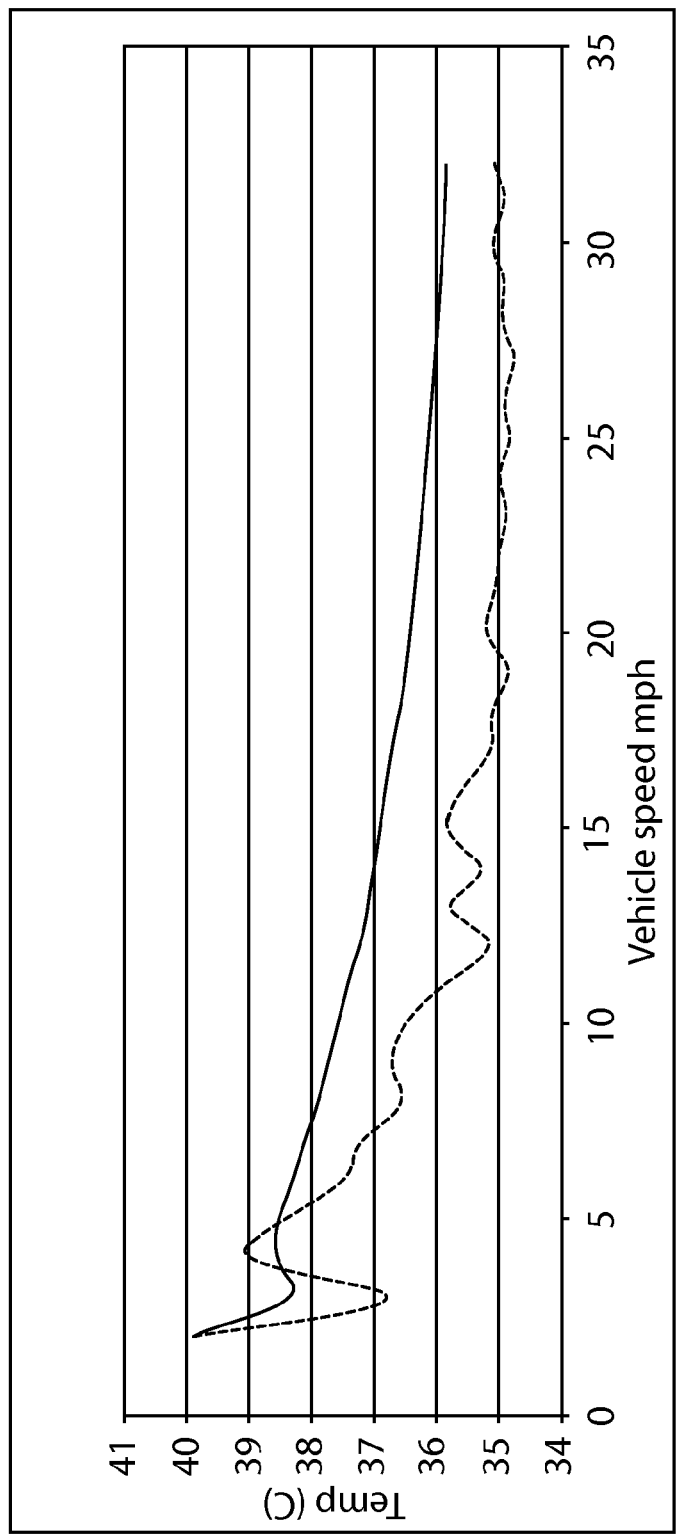
FIG. 5 is a graph of measured ambient temperature and estimated ambient temperature as a function of vehicle speed, wherein the estimated temperature is obtained utilizing a method according to one aspect of the present invention.
Figure 6:
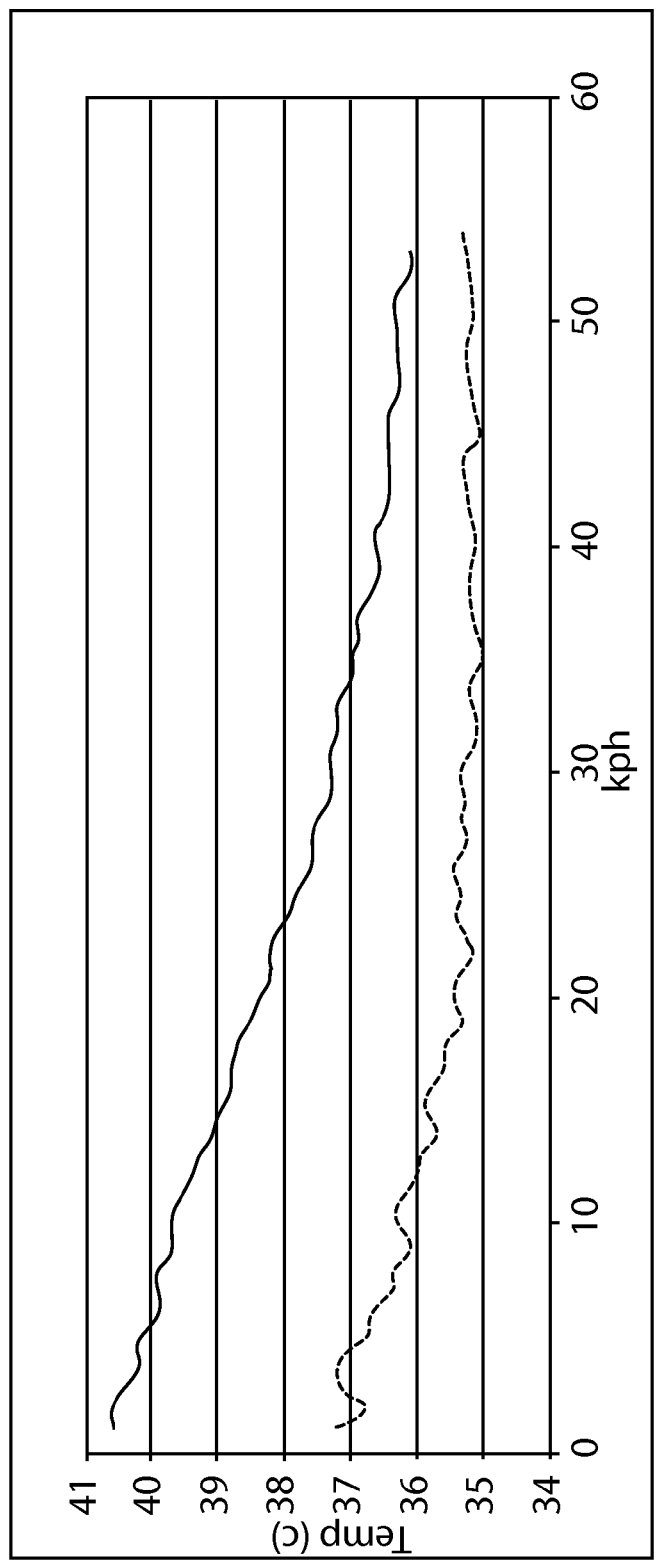
FIG. 6 is a graph of measure ambient temperature and estimated ambient temperature as a function of vehicle speed, wherein the estimated temperature is obtained utilizing a method according to another aspect of the present invention.

The graph of FIG. 4 is a scatter plot of the "b" values versus vehicle speed. The best fit line is of the form Y=Mx+B. In the illustrated example, the best fit line can be expressed as Y=0.0002x+0.0159. It will be understood that the best fit line is determined utilizing test data from a test vehicle, and the actual values for "M" and "B" will generally be different than the values shown in the illustrated example depending on the vehicle make, model, and other variables.

Once the best fit line for a particular vehicle make and model is generated, it can be utilized to determine the "b" values for a given vehicle speed, and the equation above for "c" is then utilized to calculate the estimated or predicted ambient temperature c. The table below compares the actual ambient temperature, raw/measured ambient temperature, and the estimated/predicted temperature using method 3 and the best fit line for "b" from FIG. 4.

| Time | Actual Ambient Temperature (° C.) | Raw (measured) Ambient Temperature (° C.) | Vehicle Speed (kph) | Predicted/Estimated Ambient Temperature (° C.) |
|---|---|---|---|---|
| 0.0 | 34.5 | 45.9 | 66.6 | 45.9 |
| 1.0 | 34.5 | 45.5 | 71.3 | 39.9 |
| 2.0 | 34.5 | 45 | 74.6 | 36.8 |
| 3.0 | 34.5 | 45 | 78.1 | 39.0 |
| 4.0 | 34.5 | 44.7 | 81.2 | 38.4 |
| 5.0 | 34.5 | 44.3 | 83.7 | 37.5 |
| 6.0 | 34.5 | 44 | 85.8 | 37.2 |
| 7.0 | 34.5 | 43.6 | 86 | 36.6 |
| 8.0 | 34.5 | 43.4 | 85.6 | 36.7 |
| 9.0 | 34.5 | 43.1 | 84.7 | 36.5 |
| 10.0 | 34.5 | 42.7 | 83.7 | 35.9 |
| 11.0 | 34.5 | 42.2 | 82.6 | 35.2 |
| 12.0 | 34.5 | 42.2 | 81.4 | 35.8 |
| 13.0 | 34.5 | 41.8 | 80.1 | 35.3 |
| 14.0 | 34.5 | 41.8 | 78.6 | 35.8 |
| 15.0 | 34.5 | 41.5 | 77.1 | 35.6 |
| 16.0 | 34.5 | 41.1 | 75.7 | 35.1 |
| 17.0 | 34.5 | 40.9 | 73.9 | 35.1 |
| 18.0 | 34.5 | 40.6 | 69.7 | 34.9 |
| 19.0 | 34.5 | 40.6 | 65.5 | 35.2 |

The methods described above, and in particular method 3, provides a way to determine the ambient temperature quickly, while the measured ambient temperature readings are still dropping. The method also accounts for vehicle speed, such that errors resulting from variations in vehicle speed are reduced compared to other methods that do not take into account vehicle speed in estimating the ambient temperature.

The methods described above can be implemented utilizing an algorithm programmed in a controller 1 (FIG. 1). The algorithm can be used with other existing algorithms utilized for determining ambient temperature. For example, the algorithm implementing method 3 may be utilized when the measured temperature is dropping after a vehicle begins moving, and a different (e.g. preexisting) algorithm may be used under other vehicle operating conditions.

The time utilized in the methods above is measured from the start of vehicle motion. The start of vehicle motion may be determined utilizing predefined criteria. For example, time "zero" could comprise a time at which the vehicle has been moving above a selected speed (e.g. one mph) for a selected period of time (e.g. 2 seconds). Also, the start time may be defined according to predefined criteria (e.g. vehicle operating parameters) that are not related to motion of the vehicle. For example, if the ambient temperature is quite warm (e.g. 90° F.) and if a vehicle is parked and the engine is turned off after being in operation, the temperature readings from temperature sensor 5 will tend to rise due to heat from the engine raising the air temperature in the engine compartment. If a user restarts the vehicle within a few minutes, the readings from temperature sensor 5 will tend to be much higher than the actual ambient temperature. Inaccurate readings due to heat from the engine may occur for several hours. Similarly, if a vehicle is parked after being in operating during cold ambient conditions (e.g. 20° F.) the temperature readings from the temperature sensor 5 may also be inaccurate due to the effects of engine heat and/or loss of airflow around the temperature sensor 5. The present system/method may be utilized to estimate the ambient temperature in situations such as this as well. For example, the start time may comprise the time at which a vehicle is in park and the engine is turned off. Three or more temperature readings at known times can be utilized in conjunction with the algorithms/methods described above to account for the changing temperature readings from temperature sensor 5.

The methods described herein can be utilized to estimate an ambient temperature in a variety of situation in which a temperature reading from a sensor is changing. In general, if a vehicle's temperature sensor reading as a function of time and a difference between ambient temperature and a measured temperature is known for a given set of operating conditions, this functional relationship can be utilized to estimate ambient temperature based on a plurality of measured temperatures at different times. Thus, although the temperature change as a function of time can be described utilizing Newton's law, other equations may also be utilized to estimate ambient temperature if such equations can be determined for a particular vehicle/operating conditions.

It is to be understood that variations and modifications can be made to the systems and aforementioned methods without departing from the concepts of the present invention, and further it is to be understood that such concepts are intended to be covered by the following claims unless these claims by their language expressly state otherwise.

We claim:

1. A temperature sensing system for movable vehicles, the system comprising:
   a temperature sensor configured to mount to a vehicle to measure a temperature of air defining an ambient temperature;
   a controller operably connected to the temperature sensor and obtaining a plurality of temperature readings from the temperature sensor at distinctly different times;
   wherein a rate of change of the temperature of the readings from the temperature sensor when the temperature sensor is exposed to air at an ambient temperature is generally equal to a time factor multiplied by a difference between a temperature reading of the temperature sensor at a plurality of selected times and an ambient temperature at the selected times such that a difference between the temperature readings and an ambient temperature is reduced over time until the temperature readings are about equal to the ambient temperature; and wherein:
   the controller utilizes predefined data concerning the time factor to estimate the ambient temperature utilizing a plurality of temperature readings taken at selected times at which there is a significant difference between at least some of the temperature readings.

2. The temperature sensing system of claim 1, wherein:
   the time factor varies with a speed of a vehicle;
   the controller utilizes at least two different values of the time factor to estimate the ambient temperature.

3. The temperature sensing system of claim 2, wherein:
   the controller receives a signal corresponding to a speed of a vehicle;
   the controller utilizes values of the time factor that are determined at least in part, on a speed of a vehicle.

4. The temperature sensing system of claim 1, wherein:
   the controller is configured such that an acceptable estimate of the ambient temperature is obtained in no more than about twenty seconds from a start time, wherein the start time is defined by a vehicle initiating motion after being stopped, and wherein the acceptable estimate meets predefined accuracy criteria with respect to differences between the estimate and the ambient temperature.

5. The temperature sensing system of claim 4, wherein:
   the system is configured to provide an acceptable estimated ambient temperature that is within one degree Celsius of the ambient temperature.

6. The temperature sensing system of claim 4, wherein:
   the controller is configured to determine additional estimated temperatures after determining the acceptable estimated ambient temperature.

7. The temperature sensing system of claim 3, wherein:
   the controller is programmed to determine the time factor utilizing an equation that determines the time factor as a function of a time interval from when a vehicle starts moving to the time at which the temperature is measured.

8. The temperature sensing system of claim 7, wherein:
   the equation comprises a second order polynomial.

9. The temperature sensing system of claim 3, wherein:
   the controller utilizes a look up table of predetermined values for the time factor and utilizes a selected one of the predetermined values corresponding to a time at which a temperature reading is taken.

10. A method of estimating an ambient temperature of air that is external to a motor vehicle, the method comprising:
    providing a temperature sensor configured to mount to a vehicle to measure temperature of air defining an ambient temperature;
    determining a rate of change of temperature readings for a vehicle as a function of temperature differences between a measured temperature and an ambient temperature;
    providing a controller that is operably connected to the temperature sensor;
    obtaining a plurality of temperature readings from the temperature sensor at distinctly different times;
    configuring the controller to estimate the ambient temperature utilizing a plurality of temperature readings taken at selected times at which there is a significant difference between at least some of the temperature readings.

11. The method of claim 10, wherein:
    a rate of change of the temperature of the readings from the temperature sensor when the temperature sensor is exposed to air at an ambient temperature outside a vehicle is generally equal to a time factor multiplied by a difference between a temperature reading of the temperature sensor at a plurality of selected times and an ambient temperature at the selected times such that a difference between the temperature readings and an ambient temperature is reduced over time until the temperature readings are about equal to the ambient temperature.

12. The method of claim 11, including:
    calculating a plurality of time factors utilizing measured ambient temperatures at known vehicle velocities at known time intervals starting from a time at which a vehicle starts moving.

13. The method of claim 12, including:
    determining a best fit line of the value of the time factor as a function of vehicle velocity;
    determining at least two calculated values of the time factor at two vehicle speeds;
    utilizing the two calculated values of the time factor to estimate an ambient temperature.

14. The method of claim 13, wherein:
    determining a best fit line includes utilizing a linear best fit line of the form $y=ax+b$.

15. A method of estimating ambient temperature of air around a vehicle, comprising:
    providing a vehicle with a sensor having a rate of change of temperature that is equal to the product of a factor and a difference between a measured temperature and an ambient temperature;
    describing the factor as a function of vehicle speed;

utilizing measured temperatures at known times and vehicle speeds to calculate two values of the factor and an estimated temperature.

16. The method of claim 15, wherein:
the equation describing the time factor as a function of vehicle speed is a linear equation.

17. The method of claim 16, including:
utilizing a plurality of temperatures measured by the sensor at known times and vehicle speeds and an ambient temperature to determine the factor as a function of vehicle speed.

18. The method of claim 17, wherein:
the known times are defined relative to a start time at which the vehicle starts to move according to predefined criteria.

19. The method of claim 17, wherein:
the estimated temperature is determined in about twenty seconds or less from the start time.

20. The method of claim 19, wherein:
The estimated temperature is calculated utilizing a preprogrammed processor of a motor vehicle.

\* \* \* \* \*